United States Patent
Kim et al.

(10) Patent No.: US 11,440,824 B2
(45) Date of Patent: Sep. 13, 2022

(54) APPARATUS FOR INHIBITING FORMATION OF CALCIUM BASED CRYSTAL AND APPARATUS FOR WATER TREATMENT USING THE SAME

(71) Applicant: KOREA INSTITUTE OF SCIENCE AND TECHNOLOGY, Seoul (KR)

(72) Inventors: Hye-won Kim, Seoul (KR); Seong Pil Jeong, Seoul (KR); Seockheon Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 120 days.

(21) Appl. No.: 17/022,093

(22) Filed: Sep. 16, 2020

(65) Prior Publication Data
US 2021/0300805 A1    Sep. 30, 2021

(30) Foreign Application Priority Data
Mar. 26, 2020  (KR) .................. 10-2020-0036650

(51) Int. Cl.
| | | |
|---|---|---|
| C02F 5/08 | (2006.01) | |
| B01D 61/08 | (2006.01) | |
| C02F 1/00 | (2006.01) | |
| C02F 1/44 | (2006.01) | |
| C02F 103/08 | (2006.01) | |

(52) U.S. Cl.
CPC .............. *C02F 5/083* (2013.01); *B01D 61/08* (2013.01); *C02F 1/008* (2013.01); *C02F 1/441* (2013.01); *C02F 1/447* (2013.01); *C02F 2103/08* (2013.01); *C02F 2209/001* (2013.01); *C02F 2209/055* (2013.01); *C02F 2303/22* (2013.01)

(58) Field of Classification Search
CPC ........................... C02F 5/083; C02F 2303/22
USPC ................... 210/698–701, 662, 667
See application file for complete search history.

(56) References Cited

U.S. PATENT DOCUMENTS

| | | | | |
|---|---|---|---|---|
| 8,143,204 B2 * | 3/2012 | Fernholz | ............... | C11D 3/044 426/321 |
| 2003/0173303 A1 * | 9/2003 | Austin | ............... | C02F 5/10 210/698 |
| 2008/0274928 A1 * | 11/2008 | Smith | ............... | C11D 3/10 510/161 |

(Continued)

FOREIGN PATENT DOCUMENTS

| | | |
|---|---|---|
| EP | 2837602 A1 | 2/2015 |
| JP | 7-185590 A | 7/1995 |

(Continued)

OTHER PUBLICATIONS

George M. Ayoub et al., "Precipitation softening: a pretreatment process for seawater desalination," Environ Sci Pollut Res, 2014, pp. 2876-2887, vol. 21, No. 4.

(Continued)

*Primary Examiner* — Nina Bhat
(74) *Attorney, Agent, or Firm* — Cantor Colburn LLP

(57) ABSTRACT

An apparatus for inhibiting formation of calcium based crystal, in which formation of calcium based crystals is inhibited by adding an optimal amount of magnesium to raw water having a high concentration of calcium ions and a high variation in calcium ion concentration and an apparatus for water treatment using the same.

16 Claims, 5 Drawing Sheets

(56) References Cited

U.S. PATENT DOCUMENTS

| | | | | |
|---|---|---|---|---|
| 2009/0188861 | A1* | 7/2009 | Higgin | B01D 61/025 210/636 |
| 2010/0181252 | A1* | 7/2010 | Mayer | B01D 61/022 210/668 |
| 2011/0089115 | A1* | 4/2011 | Lu | C23F 14/02 210/683 |
| 2011/0139378 | A1* | 6/2011 | Lakatos | C02F 9/00 159/48.2 |
| 2013/0161267 | A1* | 6/2013 | Palmer | C02F 1/68 210/753 |
| 2014/0319063 | A1* | 10/2014 | Hernandez Altamirano | C02F 5/10 210/698 |
| 2015/0144162 | A1* | 5/2015 | Ali | C07F 9/3808 526/278 |
| 2015/0368133 | A1* | 12/2015 | Gamache | C02F 1/44 210/664 |
| 2018/0290903 | A1* | 10/2018 | Aronson | B01D 61/08 |

FOREIGN PATENT DOCUMENTS

| | | |
|---|---|---|
| JP | 5910732 B2 | 4/2016 |
| KR | 1020020015348 A | 2/2002 |
| KR | 100911456 B1 | 8/2009 |
| KR | 1020090107534 A | 10/2009 |
| KR | 101410910 B1 | 7/2014 |
| KR | 1020150131180 A | 11/2015 |
| KR | 101601835 B1 | 3/2016 |
| KR | 101817548 B1 | 2/2018 |
| WO | 0076922 A2 | 12/2000 |
| WO | 2008088975 A1 | 7/2008 |
| WO | 2014150848 A1 | 9/2014 |

OTHER PUBLICATIONS

Tao Chen et al., "Influence of Mg2+ on CaCO3 formation—bulk precipitation and surface deposition," Chemical Engineering Science, 2006, pp. 5318-5327, vol. 61.

* cited by examiner

APPARATUS FOR INHIBITING FORMATION OF CALCIUM BASED CRYSTAL AND APPARATUS FOR WATER TREATMENT USING THE SAME

CROSS-REFERENCE TO RELATED APPLICATION

This application claims priority to Korean Patent Application No. 10-2020-0036650, filed on Mar. 26, 2020, and all the benefits accruing therefrom under 35 U.S.C. § 119, the contents of which in its entirety are herein incorporated by reference.

BACKGROUND

1. Field

The present disclosure relates to an apparatus for inhibiting formation of calcium based crystal and an apparatus for water treatment using the same, and more particularly, to an apparatus for inhibiting formation of calcium based crystal, in which formation of calcium based crystals is inhibited by adding an optimal amount of magnesium to raw water having a high concentration of calcium ions and a high variation in calcium ion concentration and an apparatus for water treatment using the same.

2. Description of the Related Art

A desalination technology removes ions from various types of raw water to be treated, such as seawater, interfaces, surface water, groundwater, sewage and wastewater to produce pure water, and it is used as technology for producing raw water such as seawater desalination and sewage recycling. The desalination technology is used as the main water production technology in countries with water deficits such as Middle East, United States, Australia, China and Singapore, and it is used to treat sewage to drinking water or grey water.

The desalination technology separates impurities using a membrane or uses heating, membrane distillation and electrodialysis processes, and when the process is performed for a predetermined time or longer, scales are formed on the membrane surface and the piping system.

The scales formed on the membrane surface and the piping system are a combination of metal ions and salts included in the raw water to be treated, and as the desalination process proceeds, the scales increase in size, resulting in reduced filtration efficiency of the membrane and causing the clogged piping system. Calcium based scales such as $CaCO_3$ and $CaSO_4$ are the major scales.

Accordingly, it is necessary to inhibit scaling, and scaling inhibition technology uses methods of inducing the precipitation of scales using chemicals, methods using ion exchange resin, and methods for thermal decomposition of scales through heating.

However, the traditional scaling inhibition technology as described above is not effective in the seawater desalination process. Since seawater has a high concentration of metal ions and a change in the concentration of metal ions depending on the climate, when an apparatus for the above-described process is applied, it is necessary to adjust the process condition of the apparatus frequently, resulting in low scaling inhibition efficiency.

In addition, recently, a water treatment process with minimized discharge of concentrated water is required. The minimized discharge of concentrated water signifies concentrated impurities in raw water on the maximum level, and it implies that the concentration of impurities in raw water containing metal ions is very high. When the discharge of concentrated water is minimized by performing a membrane process on raw water containing a high concentration of metal ions, scales are easily formed due to the high concentration of metal ions, causing membrane fouling quickly.

When the traditional scaling inhibition technology as described above is applied to the membrane distillation process for raw water containing a high concentration of metal ions, it is impossible to effectively inhibit scaling due to the high concentration of metal ions and a variation in metal ion concentration as in the seawater desalination process.

In addition, the traditional scaling inhibition technology needs a process of precipitating or filtering scales to separate the scales, and thus involves complexity of the process.

RELATED LITERATURES

Patent Literatures (Patent Literature 1) Korean Patent No. 1410910
(Patent Literature 2) Korean Patent No. 1601835
(Patent Literature 3) (Non-Patent Literature 1) Ayoub, G. M., Zayyat, R. M. and Al-Hindi, M. (2014) Precipitation softening: a pretreatment process for seawater desalination. Environmental Science and Pollution Research 21(4), 2876-2887.

SUMMARY

The present disclosure is designed to solve the above-described problem, and therefore the present disclosure is directed to providing an apparatus for inhibiting formation of calcium based crystal in which formation of calcium based crystals is inhibited by adding an optimal amount of magnesium to raw water having a high concentration of calcium ions and a high variation in calcium ion concentration.

The present disclosure is further directed to providing an apparatus for water treatment using an apparatus for inhibiting formation of calcium based crystal for use in a pretreatment process of a membrane distillation process requiring highly concentrated water treatment to effectively inhibit scaling despite a high concentration of metal ions and a variation in metal ion concentration, thereby minimizing membrane contamination with scales.

To achieve the above-described object, an apparatus for inhibiting formation of calcium based crystal according to the present disclosure includes a raw water tank that stores seawater or wastewater containing a high concentration of calcium ions ($Ca^{2+}$) as raw water, a pretreatment tank that is supplied with the raw water from the raw water tank and magnesium from a magnesium supplying device together to induce a reaction for inhibiting formation of calcium based crystals in the raw water, the magnesium supplying device that supplies magnesium to the pretreatment tank, and a calcium concentration measuring device that measures a concentration of calcium included in the raw water.

A $[Mg^{2+}]/[Ca^{2+}]$ mole ratio of the raw water in the pretreatment tank may be adjusted to 6-10, and $Ca^{2+}$, $Mg^{2+}$, $CO_3^{2-}$, $SO_4^{2-}$ in the raw water may be kept in an ion state to inhibit formation of calcium based crystals.

The apparatus for inhibiting formation of calcium based crystal may further include a control device, and the control device may store an optimal $[Mg^{2+}]/[Ca^{2+}]$ mole ratio value, calculate an amount of magnesium to be added to the pretreatment tank using the optimal mole ratio value and the concentration of calcium in the raw water measured by the calcium concentration measuring device, and control an amount of magnesium supplied by the magnesium supplying device based on the calculated amount of magnesium.

The magnesium supplied by the magnesium supplying device is supplied in a form of $MgCl_2.6H_2O$.

In addition, an apparatus for water treatment using an apparatus for inhibiting formation of calcium based crystal according to the present disclosure includes a raw water tank that stores seawater or wastewater containing a high concentration of calcium ions ($Ca^{2+}$) as raw water, a pretreatment tank that is supplied with the raw water from the raw water tank and magnesium from a magnesium supplying device together to induce a reaction for inhibiting formation of calcium based crystals in the raw water, a membrane device that performs a membrane process on the raw water supplied from the pretreatment tank to produce treated water, the magnesium supplying device that supplies magnesium to the pretreatment tank, and a calcium concentration measuring device that measures a concentration of calcium included in the raw water.

The raw water may be concentrated water discharged by a reverse osmosis process of a water treatment process.

A $[Mg^{2+}]/[Ca^{2+}]$ mole ratio of the raw water in the pretreatment tank may be adjusted to 6-10, and $Ca^{2+}$, $Mg^{2+}$, $CO_3^{2-}$, $SO_4^{2-}$ in the raw water may be kept in an ion state to inhibit formation of calcium based crystals.

The apparatus for water treatment using an apparatus for inhibiting formation of calcium based crystal may further include a control device, and the control device may store an optimal $[Mg^{2+}]/[Ca^{2+}]$ mole ratio value, calculate an amount of magnesium to be added to the pretreatment tank using the optimal mole ratio value and the concentration of calcium in the raw water measured by the calcium concentration measuring device, and control an amount of magnesium supplied by the magnesium supplying device based on the calculated amount of magnesium.

The membrane device may be configured to separate concentrated water using a membrane. In addition, the membrane device may correspond to any one of a membrane device using a reverse osmosis membrane and a membrane device with a membrane distillation membrane or any type of membrane device of filtering concentrated water using a membrane.

The apparatus for inhibiting formation of calcium based crystal according to the present disclosure and an apparatus for water treatment using the same have the following effects.

It is possible to effectively inhibit the formation of calcium based crystals by optimizing the $[Mg^{2+}]/[Ca^{2+}]$ mole ratio in raw water, thereby preventing the membrane or the piping system from being contaminated with calcium based crystals.

In addition, when a membrane process is performed on seawater or wastewater containing a high concentration of calcium ions, it is possible to prevent the membrane contamination, thereby reducing the cost spent in maintenance and cleaning such as CIP.

DETAILED DESCRIPTION

The present disclosure proposes technology that inhibits the formation of calcium based crystals by optimizing the Mg/Ca ratio in raw water, thereby retarding or preventing scale formation caused by Ca component in the raw water.

In the present disclosure, 'raw water' refers to seawater or wastewater containing a high concentration of Ca components. As mentioned above in 'Description of the Related Art', seawater has a higher concentration of metal ions containing calcium (Ca) than fresh water and a change in the concentration of metal ions depending on the climate. Additionally, in a membrane distillation process for raw water containing a high concentration of metal ions, applied to minimize the discharge of concentrated water, the corresponding raw water has a high metal ion concentration and a variation in metal ion concentration.

The present disclosure presents technology that adjusts the $[Mg^{2+}]/[Ca^{2+}]$ mole ratio in raw water to 6-10 with an addition of an optimal amount of magnesium (Mg) to the raw water, thereby inhibiting the formation of calcium based crystals, and through this, preventing the membrane contamination with scales.

The calcium based crystals are $CaCO_3$ and $CaSO_4$, and calcium ions ($Ca^{2+}$) in the raw water react with salts such as $CO_3^{2-}$ and $SO_4^{2-}$ to form $CaCO_3$ and $CaSO_4$. When magnesium ions ($Mg^{2+}$) are present in the raw water, the binding of $Ca^{2+}$ to salts ($CO_3^{2-}$ or $SO_4^{2-}$) is inhibited by $Mg^{2+}$. This is because $Mg^{2+}$ can also bind to the salts ($CO_3^{2-}$ or $SO_4^{2-}$). That is, $Ca^{2+}$ and $Mg^{2+}$ compete in the binding to salts. As described above, when an optimal amount of $Mg^{2+}$ is present in the raw water, formation of calcium based crystals such as $CaCO_3$ and $CaSO_4$ is inhibited due to the competitive relationship with $Ca^{2+}$.

The present disclosure identifies through experiments that when the $[Mg^{2+}]/[Ca^{2+}]$ mole ratio in raw water is adjusted to 6-10, formation of calcium based crystals is minimized, and when the $[Mg^{2+}]/[Ca^{2+}]$ mole ratio in raw water is adjusted to 6-10 in a pretreatment process of a seawater desalination process or a pretreatment process of a membrane process for raw water containing a high concentration of metal ions, scale formation on the membrane is effectively inhibited.

Hereinafter, an apparatus for inhibiting formation of calcium based crystal according to an embodiment of the present disclosure and an apparatus for water treatment using the same will be described in detail with reference to the accompanying drawings.

Figure 1:
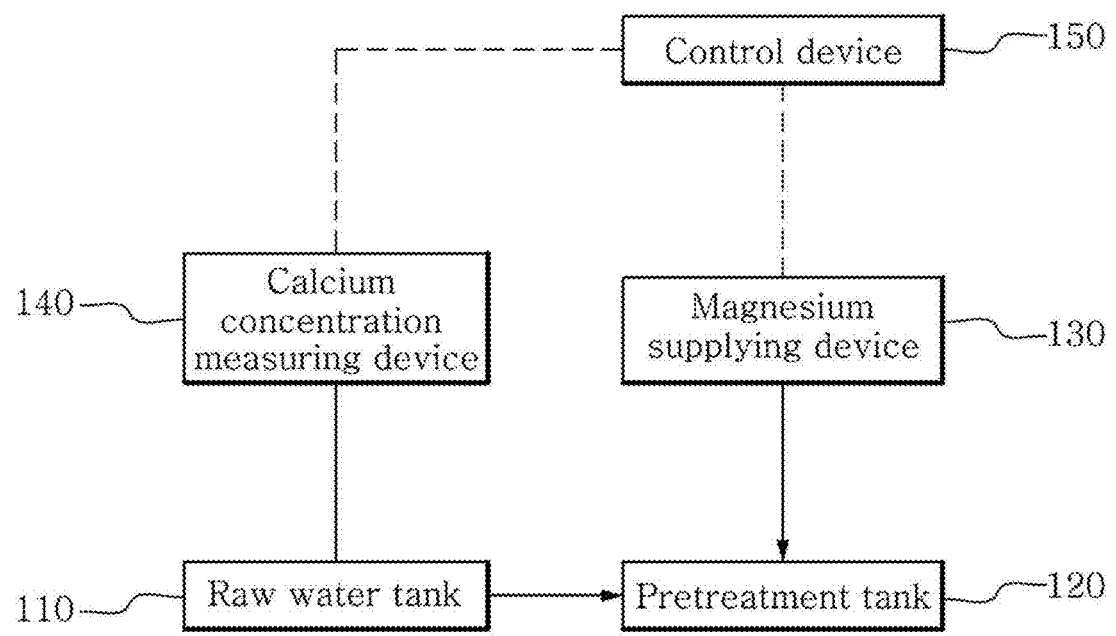
FIG. 1 is a configuration diagram of an apparatus for inhibiting formation of calcium based crystal according to an embodiment of the present disclosure.

Referring to FIG. 1, the apparatus for inhibiting formation of calcium based crystal according to an embodiment of the present disclosure includes a raw water tank 110, a pretreatment tank 120, a magnesium supplying device 130, a calcium concentration measuring device 140 and a control device 150.

The raw water tank 110 stores raw water that needs to inhibit scaling. The raw water stored in the raw water tank 110 is seawater or wastewater containing a high concentration of calcium ions ($Ca^{2+}$). The seawater contains a variety of metal ions including a high concentration of calcium ions.

The pretreatment tank 120 is supplied with the raw water from the raw water tank 110 and magnesium from the magnesium supplying device 130 together to induce a reaction for inhibiting the formation of calcium based crystals, for example, $CaCO_3$, $CaSO_4$, in the raw water.

After the raw water containing a high concentration of calcium ions or the seawater is supplied to the pretreatment tank 120, when magnesium (Mg) is supplied to the pretreatment tank 120, calcium ions ($Ca^{2+}$) and magnesium ions ($Mg^{2+}$) compete in the binding to salts. That is, calcium ions ($Ca^{2+}$) bind to salts ($CO_3^{2-}$ or $SO_4^{2-}$) to form calcium based crystals such as $CaCO_3$, $CaSO_4$, and when calcium ions ($Ca^{2+}$) and magnesium ions ($Mg^{2+}$) coexist, magnesium ions ($Mg^{2+}$) also tend to bind to salts ($CO_3^{2-}$ or $SO_4^{2-}$), and thus formation of calcium based crystals such as $CaCO_3$ and $CaSO_4$ is inhibited. Due to the competitive relationship between calcium ions ($Ca^{2+}$) and magnesium ions ($Mg^{2+}$), $Ca^{2+}$, $Mg^{2+}$, $CO_3^{2-}$, $SO_4^{2-}$ in the raw water are kept in an ion state, thereby inhibiting or retarding the formation of calcium based crystals.

As the competitive relationship between calcium ions ($Ca^{2+}$) and magnesium ions ($Mg^{2+}$) in the binding to salts ($CO_3^{2-}$ or $SO_4^{2-}$) is maximized, formation of calcium based crystals is inhibited, and it is necessary to adjust the $[Mg^{2+}]/[Ca^{2+}]$ mole ratio in raw water to 6-10 to inhibit the formation of calcium based crystals through the competitive relationship.

When the $[Mg^{2+}]/[Ca^{2+}]$ mole ratio is smaller than 6, inhibition of the formation of calcium based crystals is limited, and when the $[Mg^{2+}]/[Ca^{2+}]$ mole ratio is larger than 10, the effect of inhibition on the formation of calcium based crystals does not increase and magnesium based crystals are formed and precipitated. The numerical limitation of the $[Mg^{2+}]/[Ca^{2+}]$ mole ratio is supported by the experimental results as described below.

The magnesium supplying device 130 serves to supply magnesium (Mg) to the pretreatment tank 120, and an amount of magnesium supplied to the pretreatment tank 120 is controlled by the control device 150. The magnesium supplied by the magnesium supplying device 130 may be supplied in the form of $MgCl_2 \cdot 6H_2O$.

The calcium concentration measuring device 140 serves to measure the concentration of calcium included in the raw water, and the measured calcium concentration in the raw water is transmitted to the control device 150. The calcium concentration measuring device 140 may selectively include a variety of devices to measure the quantitative values of the components of a material.

The control device 150 stores an optimal $[Mg^{2+}]/[Ca^{2+}]$ mole ratio value, calculates an amount of magnesium to be added to the pretreatment tank 120 using the optimal mole ratio value and the concentration of calcium in the raw water measured by the calcium concentration measuring device 140, and controls an amount of magnesium supplied by the magnesium supplying device 130 based on the calculated amount of magnesium. In this instance, the optimal $[Mg^{2+}]/[Ca^{2+}]$ mole ratio value is set to 6-10 as described above.

As described above, when the optimal $[Mg^{2+}]/[Ca^{2+}]$ mole ratio value is set to 6-10, an amount of magnesium corresponding to the optimal $[Mg^{2+}]/[Ca^{2+}]$ mole ratio value is supplied to the pretreatment tank 120 in response to the concentration of calcium in the raw water, to maximize the competitive relationship between calcium ions ($Ca^{2+}$) and magnesium ions ($Mg^{2+}$) in the binding to salts ($CO_3^{2-}$ or $SO_4^{2-}$), thereby inhibiting the formation of calcium based crystals.

Subsequently, an apparatus for water treatment using an apparatus for inhibiting formation of calcium based crystal according to an embodiment of the present disclosure will be described.

Figure 2:
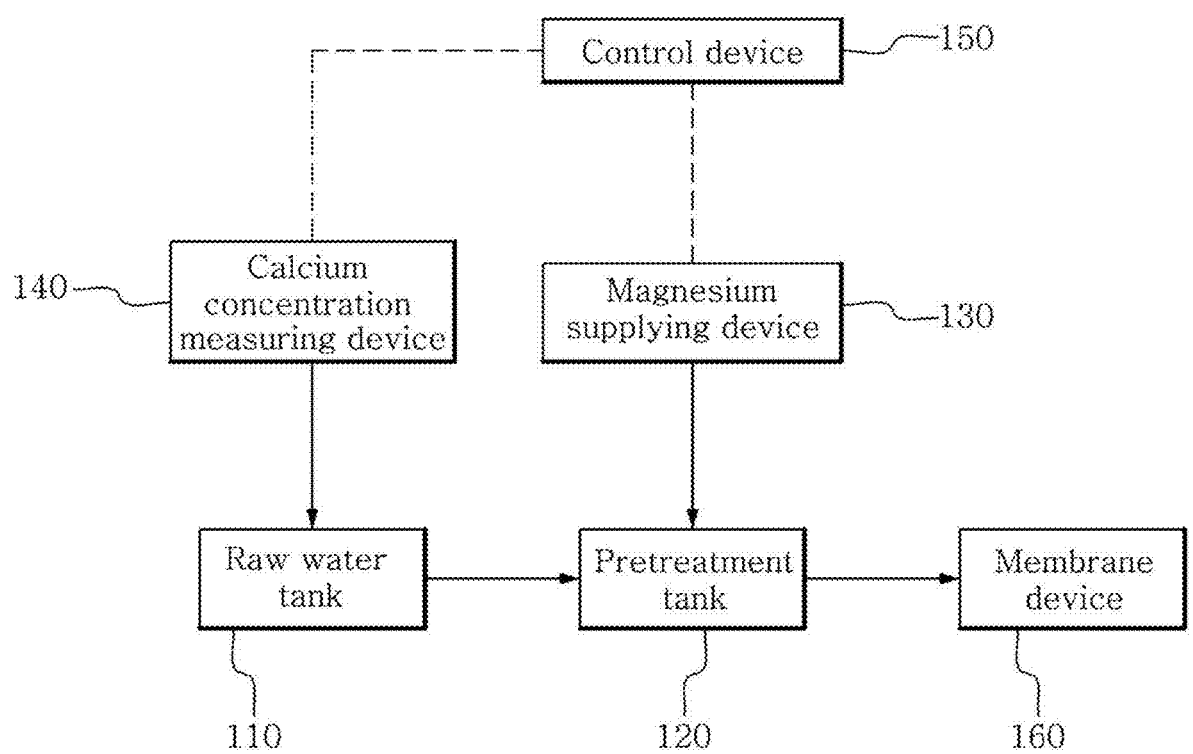
FIG. 2 shows an apparatus for water treatment using an apparatus for inhibiting formation of calcium based crystal according to an embodiment of the present disclosure.

Referring to FIG. 2, the apparatus for water treatment using an apparatus for inhibiting formation of calcium based crystal according to an embodiment of the present disclosure includes a raw water tank 110, a pretreatment tank 120 and a membrane device 160, and further includes a magnesium supplying device 130, a calcium concentration measuring device 140 and a control device 150.

The raw water tank 110 stores raw water containing a high concentration of calcium ions ($Ca^{2+}$), and the membrane device 160 performs a membrane process on the raw water containing a high concentration of calcium ions ($Ca^{2+}$) to minimize the discharge of concentrated water.

The raw water in the raw water tank 110 is seawater or wastewater containing a high concentration of calcium ions ($Ca^{2+}$), and particularly, concentrated water discharged by a reverse osmosis process of a water treatment process may correspond to the raw water. The seawater or the concentrated water discharged by a reverse osmosis process of a water treatment process is concentrated impurities, and contains a high concentration of calcium ions ($Ca^{2+}$).

The membrane device 160 is prone to scaling and may be contaminated with scales on the membrane surface due to the membrane process performed on the concentrated water discharged by the reverse osmosis process of the water treatment process or the seawater. The membrane device 160 may correspond to any one of a membrane device using a reverse osmosis membrane and a membrane device with a membrane distillation membrane or any type of membrane device of filtering concentrated water using a membrane.

The configuration of the pretreatment tank 120, the magnesium supplying device 130, the calcium concentration measuring device 140 and the control device 150 is applied to prevent the membrane of the membrane device 160 from being contaminated with scales due to the process performed on highly concentrated raw water. The configuration of the pretreatment tank 120, the magnesium supplying device 130, the calcium concentration measuring device 140 and the control device 150 has substantially the same role as that of the apparatus for inhibiting formation of calcium based crystals.

The pretreatment tank 120 is supplied with raw water from the raw water tank 110 and magnesium from the magnesium supplying device 130 together to inhibit the formation of calcium based crystals in the raw water.

After the raw water containing a high concentration of calcium ions or the seawater is supplied to the pretreatment tank 120, when magnesium (Mg) is supplied to the pretreatment tank 120, calcium ions ($Ca^{2+}$) and magnesium ions ($Mg^{2+}$) compete in the binding to salts. Due to the competitive relationship between calcium ions ($Ca^{2+}$) and magnesium ions ($Mg^{2+}$), $Ca^{2+}$, $Mg^{2+}$, $CO_3^{2-}$, $SO_4^{2-}$ in the raw water are kept in an ion state, thereby inhibiting or retarding the formation of calcium based crystals.

As the competitive relationship between calcium ions ($Ca^{2+}$) and magnesium ions ($Mg^{2+}$) in the binding to salts ($CO_3^{2-}$ or $SO_4^{2-}$) is maximized, formation of calcium based crystals is inhibited, and it is necessary to adjust the $[Mg^{2+}]/[Ca^{2+}]$ mole ratio in the raw water to 6-10 to inhibit the formation of calcium based crystals through the competitive relationship. When the $[Mg^{2+}]/[Ca^{2+}]$ mole ratio is smaller than 6, inhibition of the formation of calcium based crystals is limited, and when the $[Mg^{2+}]/[Ca^{2+}]$ mole ratio is larger than 10, magnesium based crystals are formed and precipitated.

The magnesium supplying device 130 serves to supply magnesium (Mg) to the pretreatment tank 120, and an amount of magnesium supplied to the pretreatment tank 120 is controlled by the control device 150. The magnesium supplied by the magnesium supplying device 130 may be supplied in the form of $MgCl_2.6H_2O$.

The calcium concentration measuring device 140 serves to measure the concentration of calcium included in the raw water, and the measured concentration of calcium in the raw water is transmitted to the control device 150. The calcium concentration measuring device 140 may selectively include a variety of devices to measure the quantitative values of the components of a material.

The control device 150 stores an optimal $[Mg^{2+}]/[Ca^{2+}]$ mole ratio value, calculates an amount of magnesium to be added to the pretreatment tank 120 using the optimal mole ratio value and the concentration of calcium in the raw water measured by the calcium concentration measuring device 140, and controls an amount of magnesium supplied by the magnesium supplying device 130 based on the calculated amount of magnesium. In this instance, the optimal $[Mg^{2+}]/[Ca^{2+}]$ mole ratio value is set to 6-10 as described above.

As described above, when the optimal $[Mg^{2+}]/[Ca^{2+}]$ mole ratio value is set to 6-10, an amount of magnesium corresponding to the optimal $[Mg^{2+}]/[Ca^{2+}]$ mole ratio value is supplied to the pretreatment tank 120 in response to the concentration of calcium in the raw water, to maximize the competitive relationship between calcium ions ($Ca^{2+}$) and magnesium ions ($Mg^{2+}$) in the binding to salts ($CO_3^{2-}$ or $SO_4^{2-}$), thereby inhibiting the formation of calcium based crystals. The formation of calcium based crystals in the raw water is inhibited by this principle, and when a membrane process is performed by the membrane device 160, it is possible to inhibit or retard scale formation on the membrane surface even though the distillation process is performed on the raw water containing a high concentration of calcium ions.

The apparatus for inhibiting formation of calcium based crystal according to an embodiment of the present disclosure and the apparatus for water treatment using the same have been hereinabove described. Hereinafter, the present disclosure will be described in more detail through experimental examples.

Experimental Example 1: Change in Membrane Permeability as a Function of $[Mg^{2+}]/[Ca^{2+}]$ Mole Ratio After the $[Mg^{2+}]/[Ca^{2+}]$ mole ratio in the seawater is adjusted to 5, 6, 7, 10 with an addition of $MgCl_2.6H_2O$ to seawater, a change in membrane permeability is observed.

Figure 3:
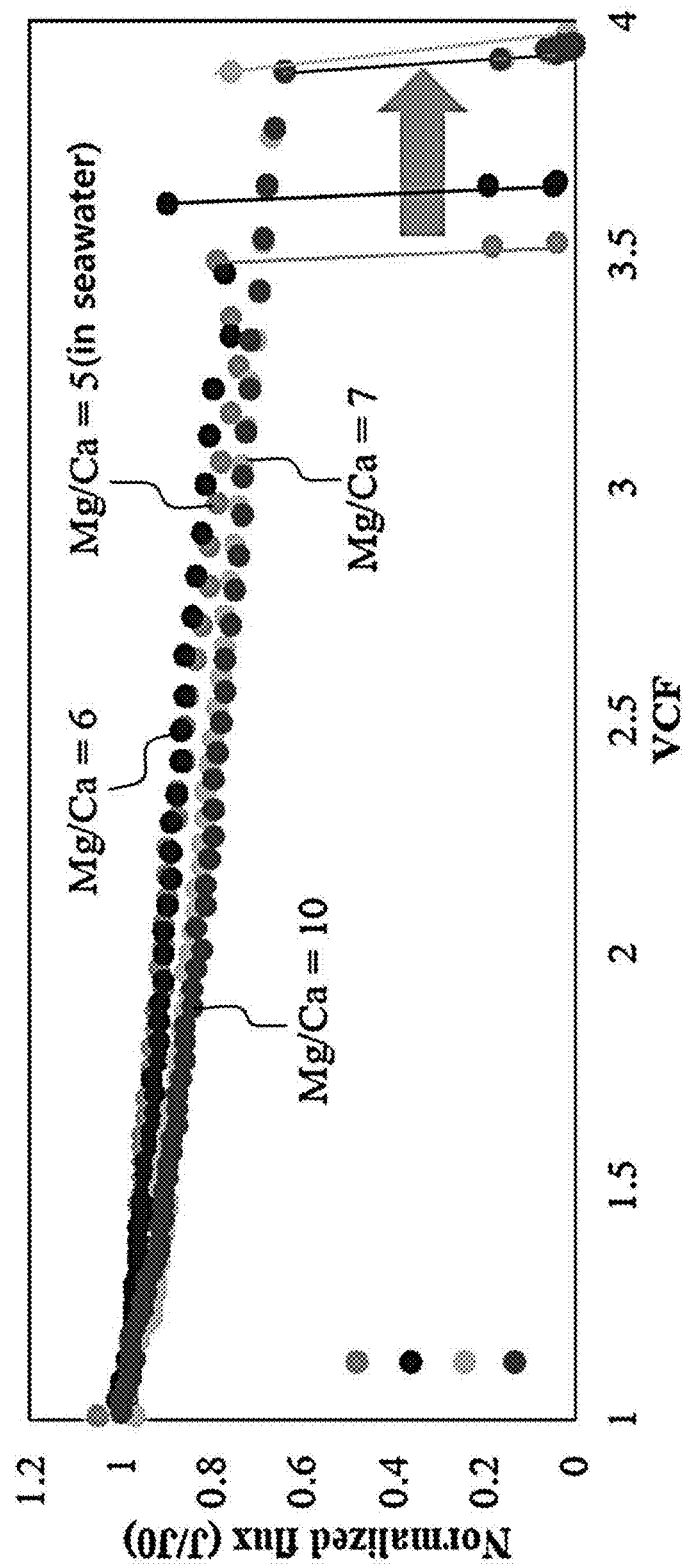
FIG. 3 illustrates experimental results showing volumetric concentration factor (VCF) changes as a function of $[Mg^{2+}]/[Ca^{2+}]$ mole ratio.

Referring to FIG. 3, when the $[Mg^{2+}]/[Ca^{2+}]$ mole ratio is 5 or more, membrane permeability is 0.2 at volumetric concentration factor (VCF) of 3.4, and when the $[Mg^{2+}]/[Ca^{2+}]$ mole ratio is 6, membrane permeability is 0.2 at VCF of 3.6 or more. In detail, when the $[Mg^{2+}]/[Ca^{2+}]$ mole ratio is 6, VCF is 3.6, and when the $[Mg^{2+}]/[Ca^{2+}]$ mole ratio is 7 and 10, VCF is 4.1.

Experimental Example 2: Change in Scaling Depending on Added or No Magnesium

For each of seawater, seawater added with $Na_2CO_3$ and NaOH, and seawater added with $MgCl_2$, a change in scale formation on the membrane surface with the increasing VCF is observed.

Figure 4A:
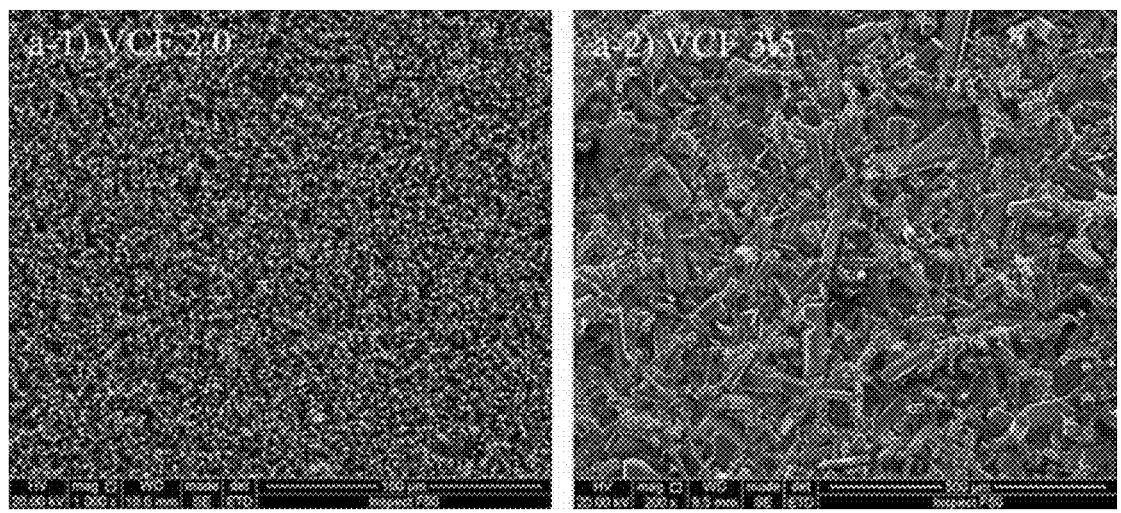
FIG. 4A to FIG. 4C illustrate experimental results showing a change in scaling depending on added or no magnesium.
Figure 4B:
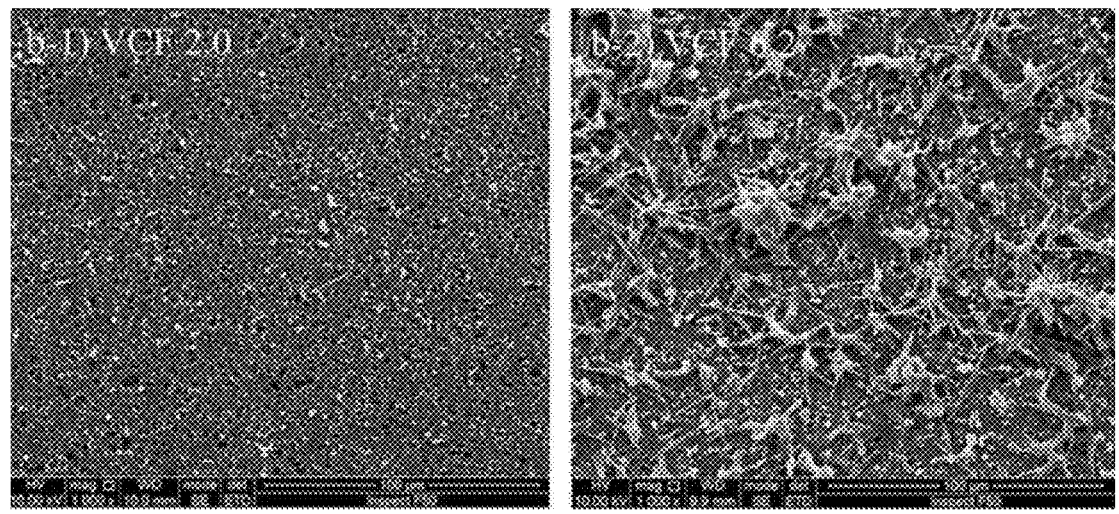
Figure 4C:
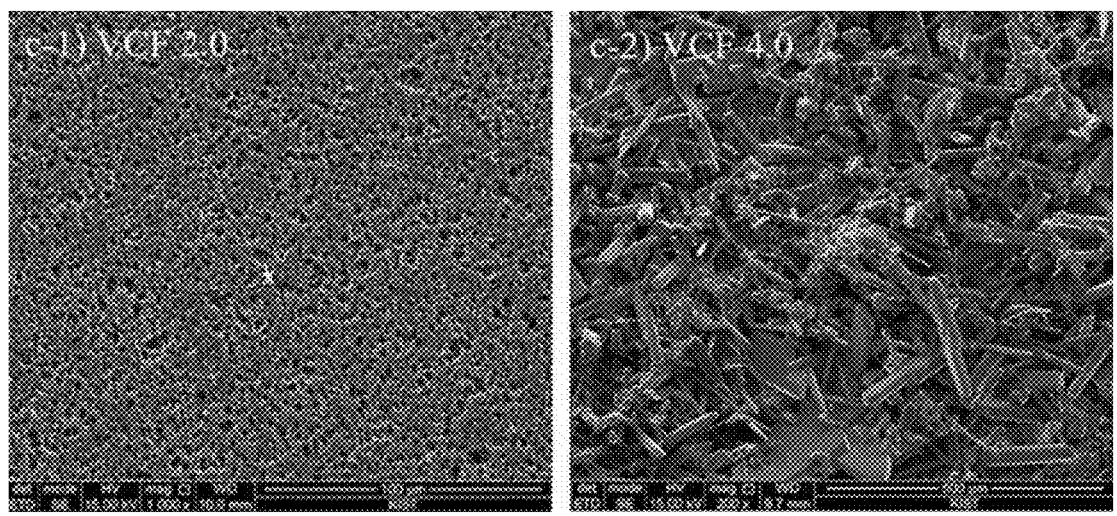

FIG. 4A is a SEM image of the membrane surface in the case of seawater, FIG. 4B is a SEM image of the membrane surface in the case of seawater added with $Na_2CO_3$ and NaOH, and FIG. 4C is a SEM image of the membrane surface in the case of seawater added with $MgCl_2$.

As shown in FIG. 4A to FIG. 4C, it can be seen that less scales are formed on the membrane surface in seawater added with $Na_2CO_3$ and NaOH than seawater, and scaling is inhibited better when $MgCl_2$ is added to seawater.

These results can be verified through the EDS results. As shown in the following Table 1, when $MgCl_2$ is added to seawater, a very small amount of calcium (Ca) of 0.1% is detected and oxygen (O) is not detected at VCF of 3.0, and these results demonstrate that calcium based crystals such as $CaCO_3$ and $CaSO_4$ are scarcely formed.

TABLE 1

<Components of each of seawater, seawater added with $Na_2CO_3$ and NaOH, and seawater added with $MgCl_2$>

| d) | Normal seawater (NS) (Atomic %) | | Softened NS (Atomic %) | | Mg added NS (Atomic %) | |
|---|---|---|---|---|---|---|
| VCFs | 2.0 | 3.5 | 2.0 | 6.2 | 3.0 | 4.1 |
| Ca | 19 | 17 | — | 4 | 0.1 | 18 |
| Mg | — | — | 8 | 4 | — | — |
| C | 19 | — | 40 | 46 | 46 | — |
| F | 8 | — | 35 | 14 | 52 | — |
| O | 54 | 68 | 16 | 27 | — | 66 |
| S | — | 15 | — | 1 | — | 16 |
| Cl | — | — | 1 | 3 | 0.2 | — |
| Na | — | — | — | — | 0.2 | — |

DETAILED DESCRIPTION OF MAIN ELEMENTS

110: Raw water tank  120: Pretreatment tank
130: Magnesium supplying device
140: Calcium concentration measuring device
150: Control device  160: Membrane device

What is claimed is:

1. An apparatus for water treatment to inhibit formation of calcium based crystal, comprising:
   a raw water tank operatively connected to a pretreatment tank to store seawater or wastewater containing a high concentration of calcium ions ($Ca^{2+}$) as raw water and to supply the raw water to the pretreatment tank;
   a magnesium supplying device operatively connected to the pretreatment tank to supply magnesium to the pretreatment tank, wherein the magnesium induces a reaction for inhibiting formation of calcium based crystals in the raw water; and
   a calcium concentration measuring device that measures a concentration of calcium included in the raw water.

2. The apparatus according to claim 1, further comprising a controller to adjust a $[Mg^{2+}]/[Ca^{2+}]$ mole ratio of the raw water in the pretreatment tank to 6-10,
   wherein $Ca^{2+}$, $Mg^{2+}$, $CO_3^{2-}$, $SO_4^{2-}$ in the raw water are kept in an ion state to inhibit formation of calcium based crystals.

3. The apparatus according to claim 1, further comprising:
   a control device, wherein the control device stores an optimal $[Mg^{2+}]/[Ca^{2+}]$ mole ratio value, calculates an amount of magnesium to be added to the pretreatment tank using the optimal mole ratio value and the concentration of calcium in the raw water measured by the calcium concentration measuring device, and controls an amount of magnesium supplied by the magnesium supplying device based on the calculated amount of magnesium.

4. The apparatus according to claim 1, wherein the magnesium supplying device supplies $MgCl_2 \cdot 6H_2O$.

5. The apparatus according to claim 1, wherein the raw water tank stores seawater.

6. The apparatus according to claim 1, wherein the raw water tank stores wastewater.

7. An apparatus for water treatment to inhibit formation of calcium based crystal, comprising:
- a raw water tank operatively connected to a pretreatment tank to store seawater or wastewater containing a high concentration of calcium ions ($Ca^{2+}$) as raw water and to supply the raw water to the pretreatment tank;
- a magnesium supplying device operatively connected to the pretreatment tank to supply magnesium to the pretreatment tank, wherein the magnesium induces a reaction for inhibiting formation of calcium based crystals in the raw water;
- a membrane device operatively connected to the pretreatment tank to produce treated water after the calcium based crystals in the raw water are inhibited from forming; and
- a calcium concentration measuring device that measures a concentration of calcium included in the raw water.

8. The apparatus according to claim 1, further comprising a reverse osmosis membrane operatively connected to the raw water tank to supply the raw water.

9. The apparatus according to claim 7, wherein the raw water tank stores seawater.

10. The apparatus according to claim 7, further comprising a reverse osmosis membrane operatively connected to the raw water tank to supply the raw water.

11. The apparatus according to claim 7, further comprising a controller to adjust a $[Mg^{2+}]/[Ca^{2+}]$ mole ratio of the raw water in the pretreatment tank to 6-10,
wherein $Ca^{2+}$, $Mg^{2+}$, $CO_3^{2-}$, $SO_4^{2-}$ in the raw water are kept in an ion state to inhibit formation of calcium based crystals.

12. The apparatus according to claim 7, further comprising:
- a control device, wherein the control device stores an optimal $[Mg^{2+}]/[Ca^{2+}]$ mole ratio value, calculates an amount of magnesium to be added to the pretreatment tank using the optimal mole ratio value and the concentration of calcium in the raw water measured by the calcium concentration measuring device, and controls an amount of magnesium supplied by the magnesium supplying device based on the calculated amount of magnesium.

13. The apparatus according to claim 7, wherein the magnesium supplying device supplies $MgCl_2 \cdot 6H_2O$.

14. The apparatus according to claim 7, wherein the membrane device separates concentrated water using a membrane.

15. The apparatus according to claim 7, wherein the membrane device is a membrane device using a reverse osmosis membrane or a membrane device with a membrane distillation membrane.

16. The apparatus according to claim 7, wherein the raw water tank stores wastewater.

* * * * *